United States Patent [19]

Schweizer

[11] 3,731,391
[45] May 8, 1973

[54] METHOD OF DRYING PIGMENTS

[75] Inventor: Hans R. Schweizer, Reinach, Basel-Land, Switzerland

[73] Assignee: Eastman Kodak Company, Rochester, N.Y.

[22] Filed: Apr. 22, 1971

[21] Appl. No.: 136,583

[52] U.S. Cl..................................34/5, 106/308 Q
[51] Int. Cl...............................................F26b 5/06
[58] Field of Search....................34/5, 92; 106/308 Q

[56] References Cited

UNITED STATES PATENTS

| | | | |
|---|---|---|---|
| 3,159,498 | 12/1964 | Davis et al. | 34/5 X |
| 3,559,297 | 2/1971 | Figiel | 34/9 |
| 2,137,404 | 11/1938 | Hollerer | 34/9.5 |
| 2,236,445 | 3/1941 | Pfeiffer | 34/9.5 |

*Primary Examiner*—John J. Camby
*Assistant Examiner*—William C. Anderson
*Attorney*—Cecil D. Quillen, Jr. and John F. Stevens

[57] ABSTRACT

A process for drying a wet mass of finely divided and dispersed pigment particles comprising forming a mixture of a suitable organic solvent and the pigment particles, freezing the mixture, and thereafter subliming the organic solvent from the pigment particles under a reduced pressure. The resulting dried pigment is finely divided, has a soft texture and a low apparent density, and is easily dispersed in either hydrophobic or hydrophilic media.

11 Claims, No Drawings

METHOD OF DRYING PIGMENTS

This invention relates to a novel method of drying a wet mass of finely divided and dispersed pigment particles while retaining the original fine size and dispersed state of the particles by preventing secondary agglomeration which is associated with conventional drying techniques.

It is well known that the physical characteristics of pigments, such as particle size, degree of aggregation and ease of dispersion, greatly affect the properties of the pigments. That is, the optical effects of a pigment are dependent on its physical characteristics. These physical characteristics may be influenced by the methods employed in making and processing the pigment.

The particle size of a pigment powder is in general not determined by the size of the single pigment crystals, but rather by the size of the aggregates built up of a large number of individual pigment crystals. It is the nature of these aggregates which determines the ease of dispersion of the pigment in a medium. The controlling factor in this operation is not so much their actual size, but the ease with which they are broken down to smaller particles again. This characteristic is described as texture. A hard-textured pigment is difficult to break down and to disperse while a soft-textured one is easily dispersed.

The formation and behavior of pigment aggregates depends on the operations used to produce the pigment. Pigments are generally made in solutions, from which they precipitate. During that precipitation the molecules orientate themselves in such a way that crystals are formed. It is well known that practically all organic pigments and also most inorganic pigments are crystalline. The individual crystals are immediately built up into larger pigment particles. These larger pigment particles are generally considered to be the basic particles of which the freshly formed pigment consists. Individual crystals are rarely encountered.

Since pigments are generally made in a solution, they must be separated from the solvent or dried prior to being made available to the users. Thus, for example, when pigments are formed in an aqueous medium, such as azo pigments, the pigment paste obtained upon filtration contains a large amount of water. Since the mediums into which the pigment is to be incorporated by the users, such as lacquers, varnishes, paints, printing inks or plastics, are usually organic materials which are incompatible with water, the water in the pigment paste must be removed prior to use.

The bulk of solvent in which a pigment is prepared is generally removed by filtration, although centrifuging is occasionally employed. After the removal of the bulk of the solvent, there remains a stiff paste which still contains residual solvent. The pigment content of this paste is commonly no higher than 20–30 percent by weight of the paste. Therefore, the pigment must be further dried. This is usually done by drying the paste in an oven, sometimes under vacuum. This drying process, however, is detrimental with regard to pigment structure, since very large aggregates are formed from the originally small basic particles. Thus, whereas the originally small basic particles in the paste have sizes up to 5 microns, the dried pigment powder may contain agglomerates of 50 microns and larger. The dried pigment must therefore be ground again in a suitable mill to break down these large secondary agglomerates.

The drying process and the disadvantage of secondary agglomeration may be avoided if the pigment is transferred from the aqueous filter cake directly to an organic medium such as toluene, xylene, solvent naphtha or other. This process is known as flushing. However, a flushed pigment puts certain limitations upon the user, since it contains a large amount of organic solvent. This solvent must be taken into account when formulating the pigment with the medium into which it is to be incorporated. In some cases, such as in the coloration of plastics and synthetic fibers, flushed pigments may not be used because of the presence of the organic solvent.

Some pigments, such as phthalocyanine blue, phthalocyanine green, anthrapyrimidine yellow, perylene scarlet and thioindigo red-violet, are made in organic solvents. The physical properties of these pigments, as they are precipitated from the organic solvent, however, do not render them suitable for immediate use as pigments. They must first be treated further to obtain the desirable particle size, texture and tinctorial strength. One such procedure consists in dissolving the pigment in cold, concentrated sulfuric acid, and pouring this solution onto ice or into water. The pigment is thus obtained in a finely divided state; it is separated from the aqueous solution and washed to give a water-containing paste, as in the case of pigments which are produced directly in aqueous solution. Another procedure consists of milling the crude pigment with a relatively large amount of a water-soluble salt, such as sodium chloride, sometimes in the presence of a small amount of an organic solvent. The sodium chloride assists the grinding operation to obtain very small particles, while the organic solvent influences the crystalline structure of these particles to a great extent. When the grinding operation is complete, the water-soluble salt has to be removed by treating the mixture of pigment and salt with water. The pigment is therefore obtained as an aqueous slurry or paste and with regard to obtaining a dry pigment from this paste, the same observations apply as in the case of pigments which are produced directly in an aqueous solution.

It is an object of this invention to provide a new method for rapidly, efficiently and economically drying a wet mass of finely divided and dispersed pigment particles while retaining the original fine size and dispersed state of the particles.

It is a further object of this invention to provide a method for rapidly, efficiently and economically drying wet pigment particles which avoids secondary agglomeration of the particles which is associated with conventional drying techniques.

It is another object of this invention to provide a means for rapidly, efficiently and economically drying a mixture of finely divided and dispersed pigment particles to obtain dry pigment particles which are finely divided, soft textured and tinctorially strong.

These and other objects are achieved by the practice of this invention which, briefly, comprises freezing a wet mass of finely divided and dispersed pigment particles and thereafter subjecting the frozen mass to reduced pressure until dry. The pigment particles in the resultant dry mass are characterized by being finely divided, soft textured and tinctorially strong.

The wet mass of finely divided and dispersed pigment will generally contain from about 5 to 50 percent by weight of pigment. The remainder of the wet mass is an organic liquid. The wet pigment mass may be obtained by removing a portion of the liquid, by filtration or centrifuging, immediately after the pigment is formed or after appropriate treatment as previously described to improve its form. The wet mass should preferably contain no acid and should contain less than 5 percent by weight of an inorganic salt. Any acid and excess amounts of inorganic salt may be removed by washing, extraction or other conventional technique. The wet pigment mass is frozen and a vacuum is applied to the frozen mass until all of the liquid has sublimed and the pigment is completely dry.

In U.S. Pat. No. 3,159,498, freeze-drying by the use of a predominantly aqueous system is disclosed. The present invention, however, offers advantages not realized with the use of an aqueous system. Freeze-drying of aqueous pastes is slow and necessitates a high vacuum, while suitably chosen organic solvents are removed much faster and at higher pressures. Also, the heat of sublimation of organic solvents is much lower than that of water, so that much less heat is required in the process of subliming the frozen solvent. Benzene and cyclohexane are preferred organic solvents because they freeze at high temperatures, are very volatile, and do not interact with the pigments to be dried.

In the process according to this invention, frozen organic liquid is removed by a sublimation process. A frozen organic liquid with a small heat of sublimation is much more convenient in a freeze-drying process than one with a large heat of sublimation, because the total heat required for a given weight will be lower, and problems of heat transfer and overheating are consequently fewer. Heats of sublimation at a given temperature can be computed from heats of fusion of the frozen material and heats of vaporization at this temperature.

A further important factor to be considered is the vapor pressure of the frozen liquid to be removed. Vapor pressures for organic materials such as, for example, benzene and cyclohexane are much higher than that of water, and the vacuum required for their removal in freeze-drying need not be as high as in the case of water, permitting the use of smaller vacuum pumps. Also, vapor volumes to be removed by the process at actual freeze-drying temperatures are much higher (by a factor of 50–100 times) with water than with benzene or cyclohexane. With the use of water, it follows that equipment must be larger to avoid excessive pressure drops.

The pigments which may be dried in accordance with the practice of this invention include any organic pigments (e.g., azo compounds, anthraquinones, indigoid derivatives, phthalocyanines, quinoline compounds, etc.) and inorganic pigments which are well known in the art. These pigments may be prepared in liquid mediums, i.e., in organic liquids for example, by the methods hereinafter described.

In a preferred embodiment of this invention, the liquid in the wet pigment mass is an organic liquid which has a melting point between about −20° and 120° C., a vapor pressure at its melting point of greater than 5 mm. of Hg and a heat of vaporization at its freezing point of less than 300 calories/gram. By appropriate choice of organic solvent, it is possible to achieve a fast rate of sublimation. If the pigment is originally in an aqueous medium, the pigment must be transferred from its aqueous paste into the organic system.

The transfer of the pigment from its aqueous paste into an organic liquid or solvent is to be made at a temperature above the melting point of said organic liquid or solvent and is easily accomplished when the organic solvent is water-miscible such as methanol, ethanol, isopropanol, tertiary butanol, dioxane, etc. The replacement of water is accomplished by immersing the aqueous paste in the organic solvent and removing the excess water-solvent mixture by filtration or centrifugation. After a few repetitions of this operation, a practically waterfree pigment-solvent paste is obtained.

If the organic liquid is hydrophobic and water-immiscible, such as hydrocarbons and halogenated hydrocarbons (e.g., benzene, cyclohexane, p-xylene, naphthalene, 1,2-dibromoethane, tertiary butylbromide, etc.), the transfer of pigment can still be done rather simply by the convention method known as "flushing." The aqueous pigment-paste is milled or kneaded with the organic liquid until the phase-change is complete. The transfer can be assisted by warming the system slightly and by removing the eliminated water from time to time.

Another and often preferable way of transferring the pigment into a hydrophobic organic liquid is with the aid of an intermediary water-miscible organic solvent, which is also miscible with the hydrophobic organic liquid. To effect such a transfer of pigment, the aqueous paste containing the dispersed pigment is first filtered or centrifuged so as to give a pigment paste containing between 5 and 50 percent of pigment. This paste is then slurried with a water-miscible organic solvent, such as methanol, ethanol or isopropanol, and the water-solvent mixture is removed by filtration of centrifugation, leaving a pigment paste containing between 5 and 50 percent of pigment. If necessary, this operation is repeated, until most of the water is removed from the paste. The paste is then slurried up with the second organic liquid which is water-immiscible, and the pigment is again separated from the mixture of solvents by filtration or centrifuging to give a pigment paste containing between 1 and 50 percent by weight of pigment. If necessary, this operation is repeated. In order to remove all water and all water-miscible solvent, the resulting pigment paste or pigment-slurry may be boiled for some time, so that water and hydrophilic solvent distill off together with some of hydrophobic liquid as an azeotropic mixture. The slurry is then concentrated by distillation, if necessary.

If the pigment was ground in the presence of an inorganic, water-soluble salt to influence its crystalline structure, the mixture may be treated with water and washed until it is substantially salt-free, yielding a water-containing pigment paste. The aqueous paste is then treated according to one of the procedures described above. Alternatively, the mixture of pigment and salt may be slurried with a hydrophobic organic liquid which does not interfere with any organic solvent which may have been used in the grinding process to influence the crystalline structure of the pigment. This slurry is then washed with water until it contains no more inorganic salt. The water is separated from the slurry consisting of pigment and organic liquid as completely as possible. Residual traces of water may be distilled off together with some of the organic solvent as an azeotropic mixture.

The paste or slurry consisting of pigment and organic liquid is then put into a tight container and frozen. The frozen mass is connected with a vacuum sufficiently low for the sublimation of the frozen solvent. The mixture is kept frozen, and the vacuum is maintained until the pigment is completely free of organic solvent. The resulting pigment is finely divided, very soft in texture, has a low apparent density and high tinctorial power.

The process of this invention prevents the formation of secondary agglomerates while drying the pigment paste. The original small basic pigment particles (i.e., sizes up to 5 microns) such as result either in the original formation of the pigment or in subsequent processing such as by reprecipitation or by intensive milling with a water-soluble inorganic salt, are completely retained. Consequently the dry pigment obtained according to this invention has the desirable pigment characteristics previously described, i.e., a high tinctorial value, a very soft texture, a low apparent density and easy dispersability in either hydrophobic or hydrophilic media.

The following examples are included for a better understanding of the invention.

EXAMPLE 1

2-Chloro-4-nitroaniline (17.3 g.) is diazotized in acid solution and the resulting diazo solution is coupled with an alkaline solution of 2-naphthol (15.2 g.) by conventional procedures. There is thus obtained an aqueous dispersion of a red azo pigment. The solution is then filtered and the residue washed carefully with water until it is free of acid and inorganic salts. The resulting pigment paste, which weighs between 160 and 200 g., is slurried with 500 ml. of ethanol and the ethanol then is removed by suction. This treatment with ethanol is repeated. The pigment paste is then slurried with 500 ml. of cyclohexane and the excess cyclohexane is removed by applying suction. This treatment with cyclohexane is repeated twice. The resulting pigment paste is transferred into a round-bottomed flask and is frozen. While keeping the paste frozen, vacuum is applied from a suction pump until the pigment is completely dry. There is obtained 30 g. of the finely divided azo pigment having a very soft texture and high tinctorial power.

EXAMPLE 2

2-Chloroaniline (12.8 g.) is diazotized and coupled according to conventional methods with 2-naphthol-6-sulfonic acid in an alkaline solution. When coupling is complete, the orange dye is filtered. The wet dye cake is slurried with water to a volume of 700 ml. and warmed to 50° C. A solution of barium chloride (17.5 g.) in 50 ml. of water is added at once and the mixture is continuously stirred. The resultant thick mixture is warmed to 100° C. and stirred for half an hour at 100° C. It is then filtered and washed twice with 150 ml. of water, yielding a pigment paste of 120-150 g. The pigment paste is slurried three times with 125 ml. of ethanol, the excess ethanol being removed by suction each time. Then the pigment paste is slurried three times with 200 ml. benzene, excess benzene being removed by suction each time. The resulting pigment paste is transferred into a round-bottomed flask and is slurried up with an additional 100 ml. of benzene. The slurry is frozen and the benzene is removed under reduced pressure. There are obtained 43 g. of a bright orange pigment which has good tinctorial power. The pigment is easily dispersed and has a very soft texture.

EXAMPLE 3

The procedure of Example 2 is repeated, using p-xylene instead of benzene. The frozen p-xylene is removed under a vacuum of 0.5–1.5 mm. of Hg. The dry pigment obtained is identical with that obtained in Example 2.

EXAMPLE 4

The process of Example 2 is repeated using tertiary butylbromide instead of benzene. The frozen tertiary butylbromide is removed under a vacuum of 10–20 mm. of Hg. An identical dry pigment is obtained as in Example 2.

EXAMPLE 5

The wet pigment cake obtained according to the process of Example 2 from 2-chloroaniline, 2-naphthol-6-sulfonic acid and barium chloride is washed with water and then slurried with 150 ml. of 1,4-dioxane. The excess dioxane is removed by filtration. The treatment with 1,4-dioxane is repeated twice, the remaining pigment cake is frozen and the 1,4-dioxane is removed therefrom under a vacuum of 0.05–0.10 mm. of Hg. The same dry pigment is obtained as in Example 2.

EXAMPLE 6

The procedure of Example 5 is repeated using warm tertiary butanol instead of 1,4-dioxane to replace the water of the pigment cake. During this operation, the temperature of the butanol and the filter cake is maintained at about 30° C. to prevent the freezing of the tertiary butanol. The final butanol-containing pigment cake is frozen and the butanol removed under a vacuum of 0.01–0.05 mm. of Hg. The butanol is recovered in a trap which is cooled by immersion in a methanol-dry-ice mixture.

EXAMPLE 7

Copper phthalocyanine (10 g.), which has been precipitated from concentrated sulfuric acid, is mixed with anhydrous sodium carbonate (30 g.), anhydrous sodium acetate (3 g.) and biphenyl (2 g.) and the mixture ground in a high-speed centrifugal ball mill below critical speed for 5 hours. After grinding, the contents are washed with water, the biphenyl is removed by steam distillation and the pigment slurry is filtered hot and washed free of inorganic salts. The wet pigment cake is mixed with 50 ml. of isopropanol, and the excess alcohol is removed by suction. This treatment is then repeated. The alcohol-containing pigment paste is then introduced into a round-bottomed flask and stirred with 200 ml. of cyclohexane. The solution is heated to boiling under constant stirring and 150 ml. of solvent are distilled off. The residual pigment slurry is frozen and the frozen solvent is removed by applying a sufficient vacuum. There is obtained a very strong greenish blue phthalocyanine in the beta-modification, which is very soft in texture.

EXAMPLE 8

Example 7 is repeated except that 200 ml. of benzene is used in place of the cyclohexane. A dry pigment identical to that obtained in Example 7 is obtained.

EXAMPLE 9

Example 7 is repeated except that 200 ml. of 1,2-dibromoethane is used instead of cyclohexane. The same dry pigment is obtained as in Example 7.

EXAMPLE 10

Examples 7, 8 and 9 are repeated except that the isopropanol is replaced with an equal amount of methanol. The dry pigments which are obtained are identical to those obtained in Examples 7, 8 and 9.

EXAMPLE 11

Quinacridone [5,12-dihydroquino-(2,3b)-acridine-7,14-dione] (10 g.) is dissolved at 200° C. in 800 ml. of hexamethylphosphoramide and the resulting solution is filtered. The filtrate is then slowly poured into 4,000 ml. of ethanol with vigorous stirring. The mixed solutions are heated with stirring to 60° C., and the precipitated pigment is left standing overnight. The pigment is then filtered and the resulting pigment paste is carefully washed with warm ethanol to remove all hexamethylphosphoramide. While the paste is still wet it is transferred into a round-bottomed flask and 200 ml. of cyclohexane are added. The alcohol is removed by azeotropic distillation and the remaining pigment-cyclohexane slurry is frozen and the cyclohexane is removed, while being kept frozen, under a vacuum of 10–20 mm. of Hg. There results a beautiful red-violet pigment which is very soft textured, has a low apparent density and a very great tinctorial power.

EXAMPLE 12

Quinacridone (5 g.), sodium chloride (30 g.) and xylene (30 ml.) are introduced into a high-speed centrifugal ball-mill and the mixture is ground below critical speed for 6 hours. The contents are then removed from the mill and the xylene is removed by filtration. The residue is first washed with cyclohexane to remove xylene, and thereafter with water to remove all sodium chloride. The wet pigment paste is introduced into a round-bottomed flask and 80 ml. of cyclohexane are added. Any traces of water which are still present are removed by azeotropic distillation. The pigment slurry is then frozen and the cyclohexane is removed completely under a suitable vacuum, while being kept frozen. There results a very fine, soft-textured bluish-red pigment, which is very strong tinctorially.

By the processes of the foregoing examples, there may be prepared finely divided, soft textured and tinctorially strong pigments from wet masses of other pigments such as basic sulfate white lead, titanium dioxide, chrome yellow, Toluidine Red R(2-nitro-p-toluidine diazotized and coupled with 2-naphthol), Orange GG (3,3'-dimethoxybenzidine diazotized and coupled with m-xylidide), Helio Fast Yellow 6 GL (1-salicyloylaminoanthraquinone) Algol Pink R (1-benzoylamino-4-hydroxyanthraquinone), and 6,6'-dichloro-4,4'-dimethylthioindigo.

The invention has been described in detail with particular reference to preferred embodiments thereof, but it will be understood that variations and modifications can be effected within the spirit and scope of the invention.

I claim:

1. A process for obtaining dry pigment which comprises freezing a substantially water-free wet mass comprising finely divided and dispersed pigment particles and an organic liquid and thereafter subjecting the frozen mass to reduced pressure until dry, the pigment particles in the resultant dry mass being characterized by being finely divided, soft textured and tinctorially strong.

2. A process as defined in claim 1 wherein said wet mass comprises from about 5 to 50 percent by weight of said pigment particles.

3. A process as defined in claim 2 wherein said organic liquid has a melting point between about −20° and 120° C. and a vapor pressure at its melting point of greater than 5 mm. of Hg.

4. A process for obtaining dry pigment which comprises providing a wet mass of finely divided and dispersed pigment particles comprising a mixture of said pigment particles and water, replacing substantially all of the water in said wet mass with an organic liquid having a melting point between about −20° and 120° C. and a vapor pressure at its melting point of greater than 5 mm. of Hg, thereafter freezing said mass and subjecting said frozen mass to a vacuum until the pigment is free from said organic liquid, the pigment particles in the resultant dry mass being characterized by being finely divided, soft textured and tinctorially strong.

5. The process of claim 4 wherein said water is replaced with organic liquid by contacting said mixture of pigment particles and water with a water-miscible organic liquid, removing the excess water-organic liquid mixture, and repeating said contacting and removing until substantially all of the water has been replaced by said water-miscible organic liquid in the wet pigment mass.

6. The process of claim 5 wherein said water-miscible organic liquid is selected from the group consisting of tertiary butanol and dioxane.

7. The process of claim 4 wherein said water is replaced with said organic liquid by milling or kneading said mixture of pigment particles and water with a hydrophobic organic liquid and periodically removing eliminated water until substantially all of the pigment has been transferred into said organic liquid.

8. The process of claim 7 wherein said hydrophobic organic liquid is selected from the group consisting of benzene, cyclohexane, p-xylene, naphthalene, 1,2-dibromoethane and tertiary butylbromide.

9. The process of claim 4 wherein said water is replaced with organic liquid by contacting said mixture of pigment particles and water with a water-miscible organic liquid, removing the excess water-organic liquid mixture, repeating said contacting and removing until most of the water has been replaced by said water-miscible organic liquid in the wet pigment mass, thereafter contacting said wet pigment mass with a hydrophobic organic liquid, removing the excess water-miscible organic liquid-hydrophobic organic liquid mixture and repeating said contacting and removing until said wet pigment mass consists essentially of a mixture of from 1 to 50 percent by weight of said finely divided and dispersed pigment particles, the remainder consisting essentially of said hydrophobic organic liquid.

10. The process of claim 9 wherein residual water and water-miscible organic liquid is removed along with a portion of said hydrophobic organic liquid from the wet pigment mass by subjecting said wet pigment mass to azeotropic distillation.

11. The process of claim 10 wherein said water-miscible organic liquid is selected from the group consisting of methanol, ethanol, isopropanol, tertiary butanol and dioxane and said hydrophobic organic liquid is selected from the group consisting of benzene, cyclohexane, p-xylene, naphthalene, 1,2-dibromoethane and tertiary butylbromide.

* * * * *